Figure 1:
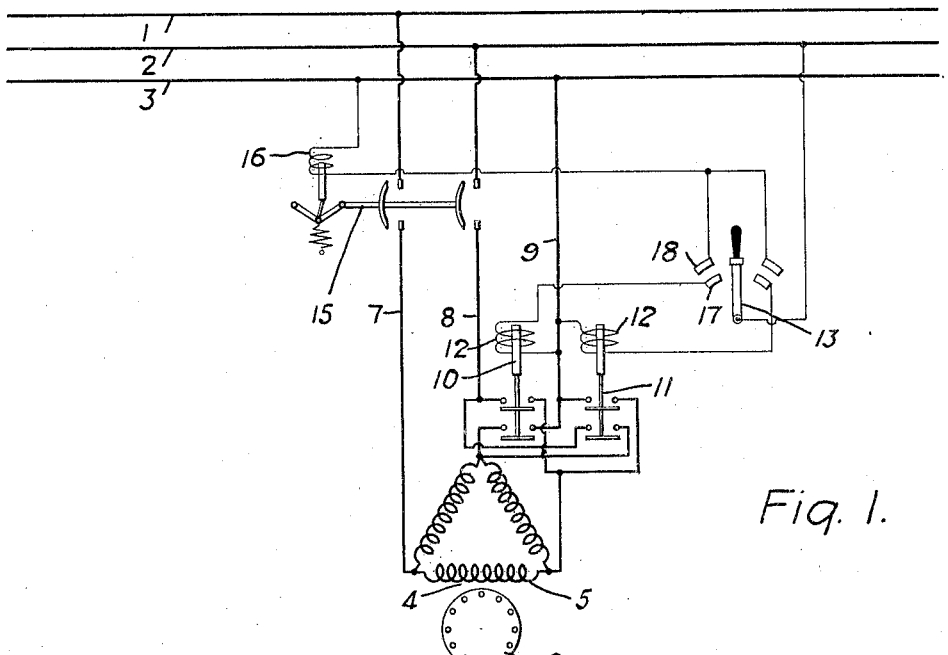

W. O. LUM.
ELECTRICAL SYSTEM.
APPLICATION FILED NOV. 6, 1915.

1,320,074.

Patented Oct. 28, 1919.

WITNESSES:

INVENTOR
Walter O. Lum.
BY
ATTORNEY

UNITED STATES PATENT OFFICE.

WALTER O. LUM, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTRICAL SYSTEM.

1,320,074.   Specification of Letters Patent.   Patented Oct. 28, 1919.

Application filed November 6, 1915. Serial No. 59,986.

*To all whom it may concern:*

Be it known that I, WALTER O. LUM, a citizen of the United States, and a resident of Wilkinsburg, in the county of Allegheny and State of Pennsylvania, have invented a new and useful Improvement in Electrical Systems, of which the following is a specification.

My invention relates to electrical systems and particularly to controlling devices therefor.

My invention has for its object to provide a simple and efficient switching mechanism for controlling electrical circuits, whereby the opening of motor circuits at desired times is insured and the motors are thereby brought to rest at predetermined points in their rotative movements without danger of over-travel.

In the operation of electric motors that are employed in connection with hoists and similar machines, it is highly desirable that means be employed for preventing over-travel of the conveying mechanisms which may be, for example, the ore buckets of mechanisms for charging blast furnaces. Such means may take the form of an automatic stop or tripping device for opening the circuit of the operating motor at a predetermined point in the path of movement of the ore bucket. In order to insure that the automatic device is effective to stop the motor at the desired point, the switching mechanism must be reliable in operation to break the motor circuit without the production of arcs which are traversed by currents sufficiently heavy to operate the motor beyond its proper limits.

I have illustrated my invention as employed in connection with a three-phase source of alternating current and an electric motor in circuit therewith. In one form of my invention, a pair of reversing switches controls the electrical connections of two of the phase conductors. A line switch controls the connections of a third conductor and one of the conductors in circuit with the reversing switches. A controller or master switch controls the line switch and the reversing switches simultaneously. The line switch and the one or the other of the reversing switches are closed simultaneously when the controller is actuated to its corresponding operative position.

In a modification, a pair of switches are arranged to control the circuit of a three-phase motor. Each of the switches controls the connections of two of the conductors, one of the conductors being in circuit with both of the switches. The switches are adapted to be controlled both by a master switch and by a series coils in accordance with overload conditions.

In each of the above arrangements, the connections of one of the conductors are controlled by two switches which open simultaneously to establish two breaks or gaps in series. In high-tension systems, this arrangement is highly advantageous, since the conductor thus controlled always constitutes a return wire for the one or the other of the remaining conductors, and the increased resistance tends to materially reduce the arcs incident to the opening of the circuit.

By opening all of the phases in the manner above described, the operation of the motor, as a single-phase machine, is effectually prevented. This condition might occur if two phases only of a three-phase circuit were controlled and one of the switch members failed to open its corresponding phase. The provision of two simultaneously operable switches, each of which is adapted to open the motor circuit, constitutes an ample safe-guard against such occurences. A three-pole switch might be employed to simultaneously control the several phases of a three-phase circuit, but such an arrangement does not embody the safety features above described. In case either of the switch members binds or sticks, it is impossible to open the switch, and the hoist mechanism or the furnace top, as the case may be, is likely to be damaged.

Figure 2:
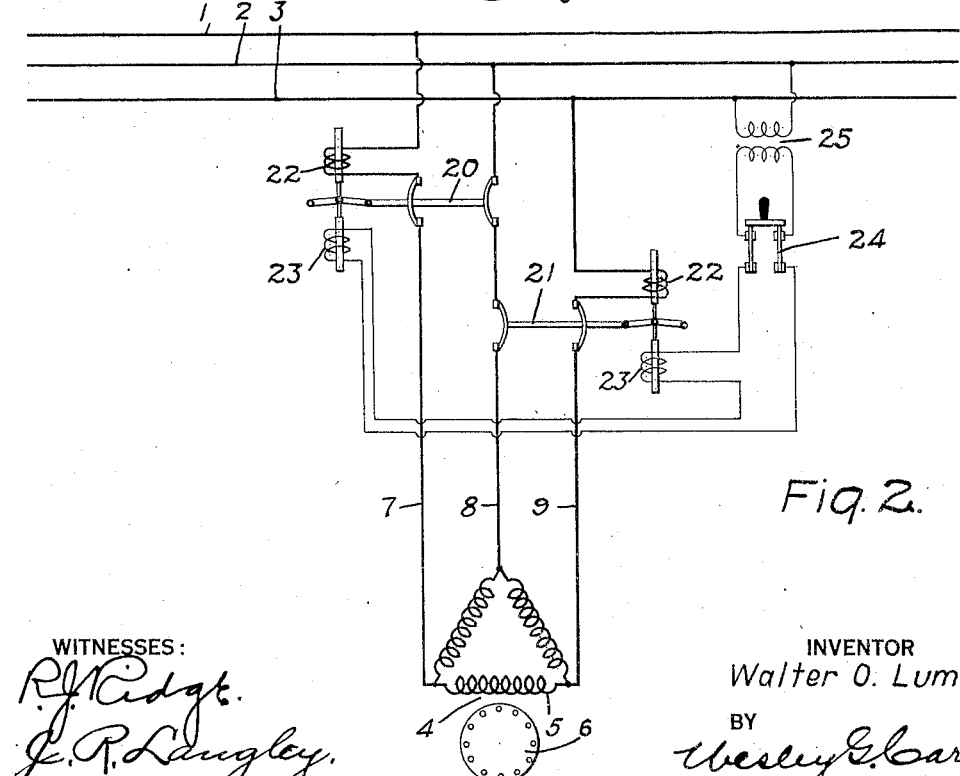

In the accompanying drawing, Figure 1 is a diagrammatic view of circuits and apparatus embodying my invention. Fig. 2 is a view, similar to Fig. 1, of a modification.

Referring particularly to Fig. 1, line conductors 1, 2 and 3, which may be connected to any suitable source of alternating current, supply energy to an electric motor 4 which may be, for example, of the squirrel-cage induction type having primary windings 5 and a rotor 6. The line conductors 1, 2 and 3 are connected to corresponding terminals of the primary windings 5 by conductors 7, 8 and 9.

Reversing switches 10 and 11 control the connections of conductors 8 and 9 to the primary windings 5 of the motor. Each of the switches 10 and 11 is provided with an actuating coil 12, the circuit of which is controlled by a master switch 13 which may be actuated either manually or by any suitable automatic means, as desired. No actuating means for the switch arm 13 is illustrated because the same forms no part of the present invention, and the operation of the system is identical whether the control of the master switch be effected manually or automatically. A line switch 15, which is provided with an actuating coil 16, controls the connections of phase conductors 7 and 8. The circuit of the actuating coil 16 is controlled by the master switch 13.

It may be assumed that the various parts occupy their illustrated or inoperative positions. To start the motor, the master switch 13 is actuated from its central or inoperative position to its operative position corresponding to the desired direction of rotaton of the motor. If, for example, the switch arm 13 be actuated to the left, a circuit is completed which extends from the line conductor 2 through switch member 13, contact member 17 and coil 12 of reversing switch 10 to line conductor 3. A second circuit, which is completed simultaneously with that traced above, extends from the switch member 13 through contact member 18 and coil 16 of line switch 15 to line conductor 3.

The coils 12 and 16 are energized to close switches 10 and 15, respectively, and thereby complete the motor circuit for operation in one direction. When the switch member 13 is returned to its "off" position, coils 12 and 16 are deënergized, and the corresponding switches 10 and 15 are opened by gravity to break the motor circuit. It will be noted that the circuit of the conductor 8 is broken both by the line switch 15 and the switch 10, thereby establishing two breaks or gaps in series.

When the switch member is actuated to the right, the coil 12 of reversing switch 11 and the coil 16 of line switch 15 are energized simultaneously, and the motor circuit is completed for operation in the direction opposite to that determined by the connections above described. When the master switch is returned to its "off" position, the switches 11 and 15 open the motor circuit, two breaks in series occurring in conductor 8.

The provision of a line switch which is controlled simultaneously with the reversing switches insures that the motor circuit is broken since, not only are all of the phases disconnected, but a double break occurs in one of the conductors controlled by the reversing switches. This arrangement reduces the chances that the motor may be reversed while arcs exist between the coacting members of the switches which may be sufficient to cause substantially short-circuit conditions or that the motor receives sufficient current, because of such arcs, to cause it to travel beyond its proper limits.

Reference may now be had to Fig. 2, in which similar reference numerals are employed to designate corresponding parts. A line switch 20 controls the connections of conductors 7 and 8, and a similar switch 21 controls the connections of conductors 8 and 9. Each of the switches 20 and 21 is provided with a series overload tripping coil 22 and a shunt actuating or closing coil 23. The circuit connections of the coils 23, which are in series with each other, are controlled by a master switch 24 which connects them to the secondary winding of a transformer 25.

When the switch 24 is closed, the coils 23 are energized to retain the switches 20 and 21 in their closed positions to complete the motor circuit. When the master switch is opened, the coils 23 are deënergized, and switches 20 and 21 are opened by gravity. The simultaneous opening of the switches establishes two gaps in series in the circuit of conductor 8, thereby tending to prevent the formation of arcs by the insertion of high resistance in one of the phases. The operation of the two-pole switches opens each of the phases of the motor circuit.

In case overload conditions occur, the coils 22 will be energized to open the switches 20 and 21 against the force of the corresponding shunt coils 23. The operation of either of the switches 20 and 21 to open two of the phases of the motor circuit is sufficient to disconnect the motor from the line and thereby prevent an excessive current from traversing its windings. The provision of two switches that are controlled in this manner constitutes an additional safe-guard against damage to the motor in case one of the switches should fail to open at the proper time. In case either of the conductors 7, 8 and 9 is grounded, the resulting overload conditions causes the switches to open the circuit of the grounded conductor, since the switches operate to open the circuits of all of the conductors.

It will be noted that, in the form of my invention last described, I employ a simple switching mechanism that may be controlled manually or automatically either by a moving element or in accordance with motor-circuit conditions.

While I have shown and described by invention as employed in connection with a three-phase circuit, it is understood that such use is illustrative only and the circuits and switching mechanisms may be arranged in accordance with the character of the source of energy. Such changes may be made as fall within the scope of the appended claims without departing from the spirit of my invention.

I claim as my invention:

1. The combination with a source of three-phase alternating currents and an electric motor, of three conductors connecting said motor to said source, two of said conductors each having a gap and the third of said conductors having two gaps, a pair of switches each bridging one of said two gaps and one of said other gaps and each having a closing coil, and means for simultaneously deenergizing said coils to effect the simultaneous opening of said switches.

2. The combination with a source of plural-phase alternating currents, an electric motor and a plurality of conductors, of a plurality of switches each connecting said motor to said source through two only of said conductors and each having a pair of coils, one for closing the corresponding switch and one in circuit with one of said conductors for opening said corresponding switch.

3. The combination with a source of three-phase alternating currents and an electric motor, of three conductors connecting said motor to said source, two of said conductors each having a gap and the third of said conductors having two gaps, a pair of switches each bridging one of said two gaps and one of said other gaps, each of said switches having an overload tripping coil in series with that one of said two conductors the gap of which it bridges, and a closing coil, and means for simultaneously energizing and deënergizing said closing coils.

4. In an electrical system, the combination with a source of three-phase alternating currents, and an electric motor in circuit therewith, of a pair of switches, each of which controls a different pair of phases in the motor circuit, means for opening and closing said switches jointly, and means for automatically opening said switches jointly or severally in accordance with overload conditions.

In testimony whereof, I have hereunto subscribed my name this 26th day of Oct. 1915.

WALTER O. LUM.

Copies of this patent may be obtained for five cents each, by addressing the "Commissioner of Patents, Washington, D. C."